(12) United States Patent
Warkentin et al.

(10) Patent No.: US 11,263,019 B2
(45) Date of Patent: Mar. 1, 2022

(54) METHOD FOR CONVERTING DEVICE TREE DATA INTO ACPI DATA FOR EDGE DEVICE OPERATING IN A NETWORK

(71) Applicant: VMware, Inc., Palo Alto, CA (US)

(72) Inventors: Andrei Warkentin, Cambridge, MA (US); Cyprien Laplace, Cambridge, MA (US); Ye Li, Cambridge, MA (US); Alexander Fainkichen, Southborough, MA (US); Regis Duchesne, Monts-de-Corsier (CH)

(73) Assignee: VMware, Inc., Palo Alto, CA (US)

( * ) Notice: Subject to any disclaimer, the term of this patent is extended or adjusted under 35 U.S.C. 154(b) by 272 days.

(21) Appl. No.: 16/521,434

(22) Filed: Jul. 24, 2019

(65) Prior Publication Data
US 2021/0026648 A1    Jan. 28, 2021

(51) Int. Cl.
*G06F 15/177* (2006.01)
*G06F 9/00* (2006.01)
*G06F 9/4401* (2018.01)
*G06F 16/22* (2019.01)

(52) U.S. Cl.
CPC ........ *G06F 9/4401* (2013.01); *G06F 16/2282* (2019.01)

(58) Field of Classification Search
CPC . G06F 9/4401; G06F 16/2282; G06F 9/45558
See application file for complete search history.

(56) References Cited

U.S. PATENT DOCUMENTS

| | | | | |
|---|---|---|---|---|
| 7,502,803 B2* | 3/2009 | Culter | ............... | G06F 9/4411 |
| 10,262,158 B1* | 4/2019 | Righi | ............... | H04L 9/3247 |
| 10,891,139 B1* | 1/2021 | Rhea | ............... | G06F 9/44505 |
| 2004/0030854 A1* | 2/2004 | Qureshi | ............... | G06F 9/4411 |
| | | | | 711/170 |
| 2006/0282651 A1* | 12/2006 | Hobson | ............... | G06F 9/4411 |
| | | | | 713/1 |
| 2014/0297999 A1* | 10/2014 | Kim | ............... | G06F 9/4401 |
| | | | | 713/1 |
| 2017/0364365 A1* | 12/2017 | Warkentin | ............... | G06F 9/4405 |
| 2020/0341673 A1* | 10/2020 | Iyer | ............... | G06F 3/0646 |

OTHER PUBLICATIONS

LINARO LTD., Devicetree Specification, Release v0.2, devicetree.org, Dec. 20, 2017, 56 pages.

* cited by examiner

*Primary Examiner* — Xuxing Chen
(74) *Attorney, Agent, or Firm* — Kim & Stewart LLP

(57) ABSTRACT

A method for generating boot tables for a device having access to device information. It is determined whether there exists at least one system boot table stored in a memory. If it is determined that a system boot table does not exist, the device information is retrieved, and the device information is converted to at least one boot table. The converting includes generating a first boot table by populating the first boot table with information of components of the device that have a correspondence to a computer system boot information standard. The generating also includes generating a second boot table for another component of the device that does not have a correspondence to the computer system boot information standard, by creating an entry in the second boot table that is populated with an identifier used to find a compatible component defined in the computer system boot standard.

20 Claims, 11 Drawing Sheets

```
Scope (\_SB.PCIO.LPC)
{
  Device (LEDS)
    Name (_HID, "PNP####")
    Name (_CRS, ResourceTemplate ()
    {
      OpioIo (Exclusive, PullDown, 0, 0, IoRestrictionOutputOnly,
              \\_SB.PCIO.LPC, 0, ResourceConsumer, , ) ( 10 )
      OpioIo (Exclusive, PullUp, 0, 0, IoRestrictionInputOnly,
              \\_SB.PCIO.LPC, 0, ResourceConsumer, , ) ( 11 )
    })
    Device (LEDH)
    {
      Name (_HID, "PNP####")
      Name (_DSD, Package () {
        ToUUID("daffd814-6eba-4d8c-8a91-bc99bbfaa301"),
        Package () {
          Package (2) {"label", "Heartbeat"},
          Package (2) {"gpics", Package (4) {
                                 \_SB.PCIO.LPC.LEDS, 0, 0, 1
                             }},
          Package (2) {"default-trigger", "heartbeat"},
          Package (2) {"default-state", "on"},
          Package (2) {"retain-state-suspended", 1},
        }
      })
      Device (LEDM)
      {
        Name (_HID, "PNP####"})
        Name (__DSD, Package () {
          ToUUID("daffd814-6eba-4d8c-8a91-bc99bbfaa301
          Package () {
            Package (2) {"label", "MMCO Activity"},
            Package (2) {"gpics", Package (4) {
                                   \_SB.PCIO.LPC.LEDS, 1, 0, 1
                               }},
            Package (2) {"default-trigger", "mmc0"},
            Package (2) {"default-state", "on"},
            Package (2) {"retain-state-suspended", 1},
          }
        })
      }
    }
```

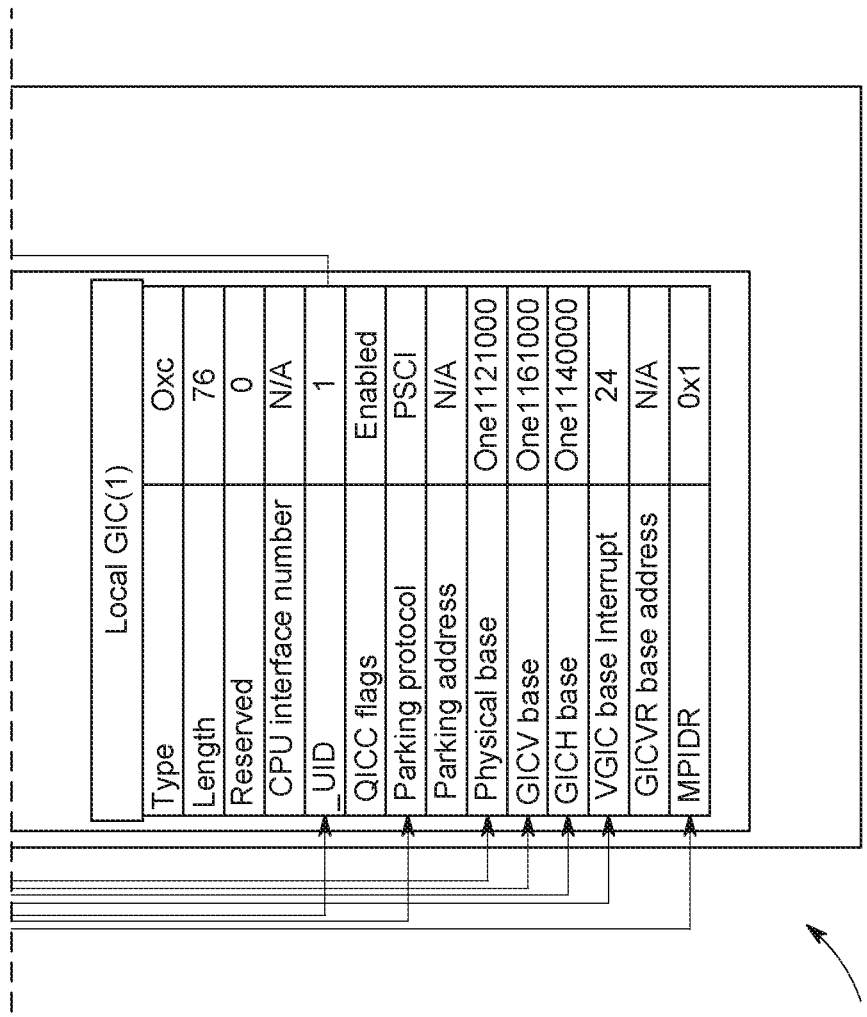

METHOD FOR CONVERTING DEVICE TREE DATA INTO ACPI DATA FOR EDGE DEVICE OPERATING IN A NETWORK

BACKGROUND

Bringing enterprise virtualization solutions to the edge of a network, such as an enterprise network, can be challenging. The edge of a network is typically a purpose-built infrastructure, with network devices deployed next to data sources and sinks within the constraints of a specific environment, and in which the edge devices typically run business-specific workloads.

The combination of business-specific workloads and specific environment constraints of a network leads customers to specific hardware platform solutions. These hardware platform solutions span a large range of performance, memory, storage, Input/Output (I/O), and power requirements. Some use cases may involve extremely low-end CPUs and/or System-On-Chips (SoCs), including chips that are not compatible with the common platform definitions that have been defined in the enterprise. Such common platform definitions include server base system architecture (SB SA) and server base boot requirements (SBBR). Instead of being compatible with SBSA and SBBR, such low end CPUs and/or SoCs are by their very nature compatible with the basic embedded base boot requirements (EBBR) specification.

SBSA provides constraints on how hardware implementations work and how much platform knowledge is necessary for an Operating System (OS) or a Hypervisor running on a machine, and may enable a single binary distribution of an OS/hypervisor to work, unmodified, on an entire set of SBSA-compliant systems. This is similar to the degree of compatibility seen on x86-based computer platforms.

SBBR regulates how an OS/hypervisor boots and discovers hardware, bringing it in line with the way it is done for x86-based computer platforms that use the Unified Extensible Firmware Interface (UEFI) standard that incorporates a computer system boot information standard such as Advanced Configuration and Power Interface (ACPI), which uses ACPI tables when booting a computer platform. UEFI has been developed as a successor to the Basic Input/Output system (BIOS), and aims to address technical shortcomings of BIOS. Today, new PC hardware predominantly ships with UEFI. UEFI is applicable across a wide range of devices (servers, workstations, etc.) and central processing units (CPUs), such as x86_64, ARM64®, x86, etc. ACPI tables are a set of data structures, passed from firmware to the OS/hypervisor by the boot code, and that describe the platform hardware in a common and well-defined manner.

Low-end and deeply embedded devices on an enterprise network, such as a WiFi router on an edge of a network, are frequently not SBBR compliant, whereby ACPI cannot be used to properly abstract the system hardware due to the hardware not being SBSA compliant. Therefore, EBBR exists for such low-end and deeply embedded devices on the enterprise network, to cover the majority of low-end SoCs that are used for such virtualized Edge solutions. EBBR does not mandate ACPI support, because ACPI may not be descriptive enough for a platform in question (e.g., Raspberry Pi 3 single board computer). Device Tree, which is an industry standard that provides a general purpose way of describing arbitrary hardware configurations and topology, is a common alternative in the low-end and deeply embedded space.

As such, there is a problem with supporting EBBR for an OS/hypervisor running on a device in an enterprise network due to the lack of support for ACPI. In particular, multiple layers of an OS/hypervisor have ACPI requirements, from low-end bootloaders (for logging), to early kernel initialization (for CPU, memory, and cache topology), to device drivers that includes public Driver Development Kit Application Program Interface (DDK API) support. To add device tree support at each of these multiple layers is very exhaustive, complex and time consuming, and as such is not an effective solution.

SUMMARY

One or more embodiments provide a method of supporting a device. The method generates boot tables for a device having access to device information. It is determined whether there exists at least one system boot table stored in a memory. If it is determined that a system boot table does not exist, the device information is retrieved, and the device information is converted to at least one boot table. The converting includes generating a first boot table by populating the first boot table with information of components of the device that have a correspondence to a computer system boot information standard. The generating also includes generating a second boot table for another component of the device that does not have a correspondence to the computer system boot information standard, by creating an entry in the second boot table that is populated with an identifier used to find a compatible component defined in the computer system boot standard.

Further embodiments include, without limitation, a non-transitory computer-readable storage medium that includes instructions for a processor to carry out the above method, and a computer system that includes a processor programmed to carry out the above method.

BRIEF DESCRIPTION OF THE DRAWINGS

FIG. 3 shows exemplary code for converting device tree-like data into ACPI data using the '_DSD device properties' feature.

FIGS. 7A, 7B and 7C, collectively FIG. 7, is a diagram showing the conversion of device tree information comprising a description of CPUs and interrupt controllers, to ACPI information corresponding to CPUs and interrupt Controllers, according to one or more embodiments.

FIG. 8, is a diagram showing the conversion of a device tree node into AML, byte-code to be stored in an ACPI DSDT Table, according to one or more embodiments.

DETAILED DESCRIPTION

Figure 1:
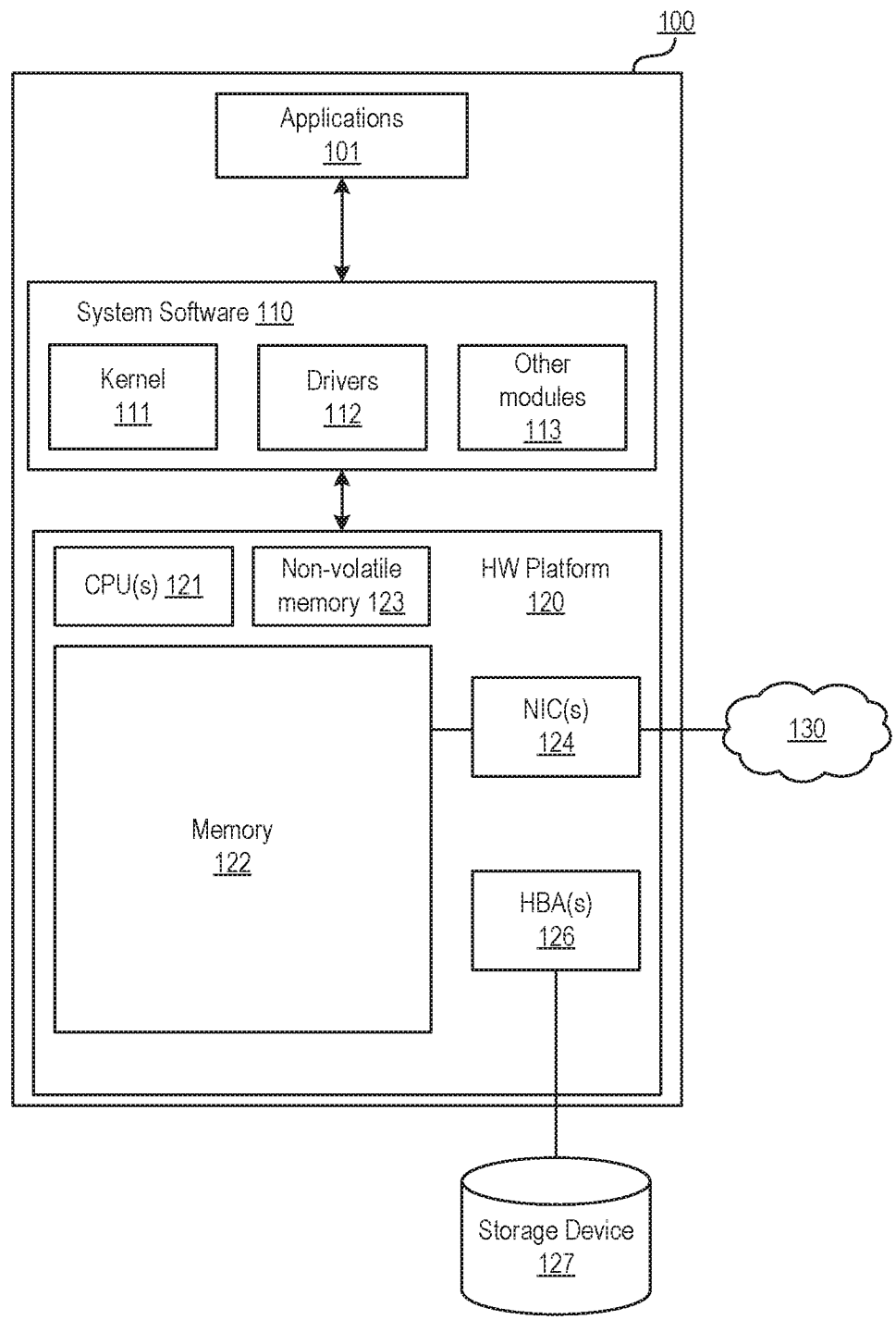
FIG. 1 is a block diagram of a computer system in which one or more embodiments may be implemented.

FIG. 1 is a block diagram of a computer system 100 in which one or more embodiments may be implemented.

Computer system 100 includes one or more applications 101 that are running on top of system software 110. System software 110 includes a kernel 111, drivers 112 and other modules 113 that manage hardware resources provided by a hardware platform 120. In one embodiment, system software 110 is an operating system (OS), such as operating systems that are commercially available. In another embodiment, system software 110 is a hypervisor (Type 1 or Type 2) that supports machine applications running thereon, e.g., a hypervisor that is included as a component of VMware's vSphere® product, which is commercially available from VMware, Inc. of Palo Alto, Calif. Hardware platform 120 includes one or more physical central processing units (pCPUs) 121, system memory 122 (e.g., dynamic random access memory (DRAM)), non-volatile memory (ROM) 123, one or more network interface cards (NICs) 124 that connect computer system 100 to a network 130 such as the Internet, and one or more host bus adapters (HBAs) 126 that connect to storage device(s) 127, which may be a local storage device or provided on a storage area network. In the descriptions that follow, pCPU denotes either a processor core, or a logical processor of a multi-threaded physical processor or processor core if multi-threading is enabled.

In the embodiments illustrated herein, computer system 100 is configured in accordance with the unified extensible firmware interface (UEFI) specification. In one embodiment, computer system 100 is booted from the storage device 127 in accordance with platform firmware stored in ROM 123. In another embodiment, computer system 100 is booted from the network 130 in accordance with platform firmware stored in ROM 123.

During booting, the platform firmware carries out the functions of initializing and testing the various hardware devices, RAM, interrupts, DMA, chipsets, and PCI devices and controllers for correct operation. The platform firmware provides two types of services—boot services and run-time services—code and data for which are loaded into system memory 122 and identically mapped to the virtual address space of the platform firmware. One of the boot services is power-on self-test (POST), which is carried out to confirm that all of the hardware devices are in working order and properly initialized. After completing POST, the platform firmware determines the location of a first level (also referred to herein as 'first-stage') boot loader and loads the first level boot loader into system memory 122. After that, the platform firmware hands off execution control to the first level boot loader. The job of the first level boot loader is to load into system memory 122 all of the modules contained in a boot image. The boot-time modules to be loaded into system memory 122 include a second level boot module, which includes the second level boot loader, system software modules, which include kernel 111, driver modules, which include drivers 112, and user application modules.

After the updating has been completed, execution control is transferred to the second level boot loader, which completes the booting process and then transfer execution control to kernel 111.

As explained earlier, Implementation of the Advanced Configuration and Power Interface (ACPI) Hardware Specification is not required on SoC-based platforms, but such information is needed by the OS/Hypervisor for effectively determining its properties so that it can communicate effectively with other devices on the enterprise network that the SoC-based platforms may want to communicate with. For example, a Wi-Fi router may be such a SoC-based platform on the edge of an enterprise network.

The ACPI specification defines several different types of tables, including a Root System Description Table (RSDP), a Fixed ACPI Description Table (FADT), a Multiple APIC Description Table (MADT), a Generic Timer Description Table (GTDT), a Core System Resources Table (CSRT), a Debug Port Table 2 (DBG2), and a Differentiated System Description Table (DSDT). In one or more embodiments, these ACPI tables are populated based on device information associated with the edge device. Such device information may be, for example, device information obtained from a Device Tree (see FIG. 2). As such, when an OS/hypervisor is running, such as on a machine at the edge of a network, the OS/hypervisor can access the ACPI tables that are needed by various layers of the OS/hypervisor to look for associated hardware and that have been created from the device information, and perform necessary actions as it may need to do.

The creation of the ACPI tables may preferably be done at a very early stage, such as when a low-level edge device is powered ON, since low-level bootloaders require ACPI tables to perform properly. In one embodiment, device information is converted into ACPI format (that is, put into appropriate ACPI tables) by a first-stage bootloader. It is noted that device information is a more general way of describing hardware as compared to ACPI information, whereby recent changes to the ACPI specification allow for a relatively straightforward conversion of device information into ACPI information. On the other hand, ACPI information cannot be converted in a straightforward manner into device information, due to ACPI including a run-time component in which device definitions are implemented in a byte-code that are capable of performing non-trivial operations affecting a hardware state.

Figure 2:
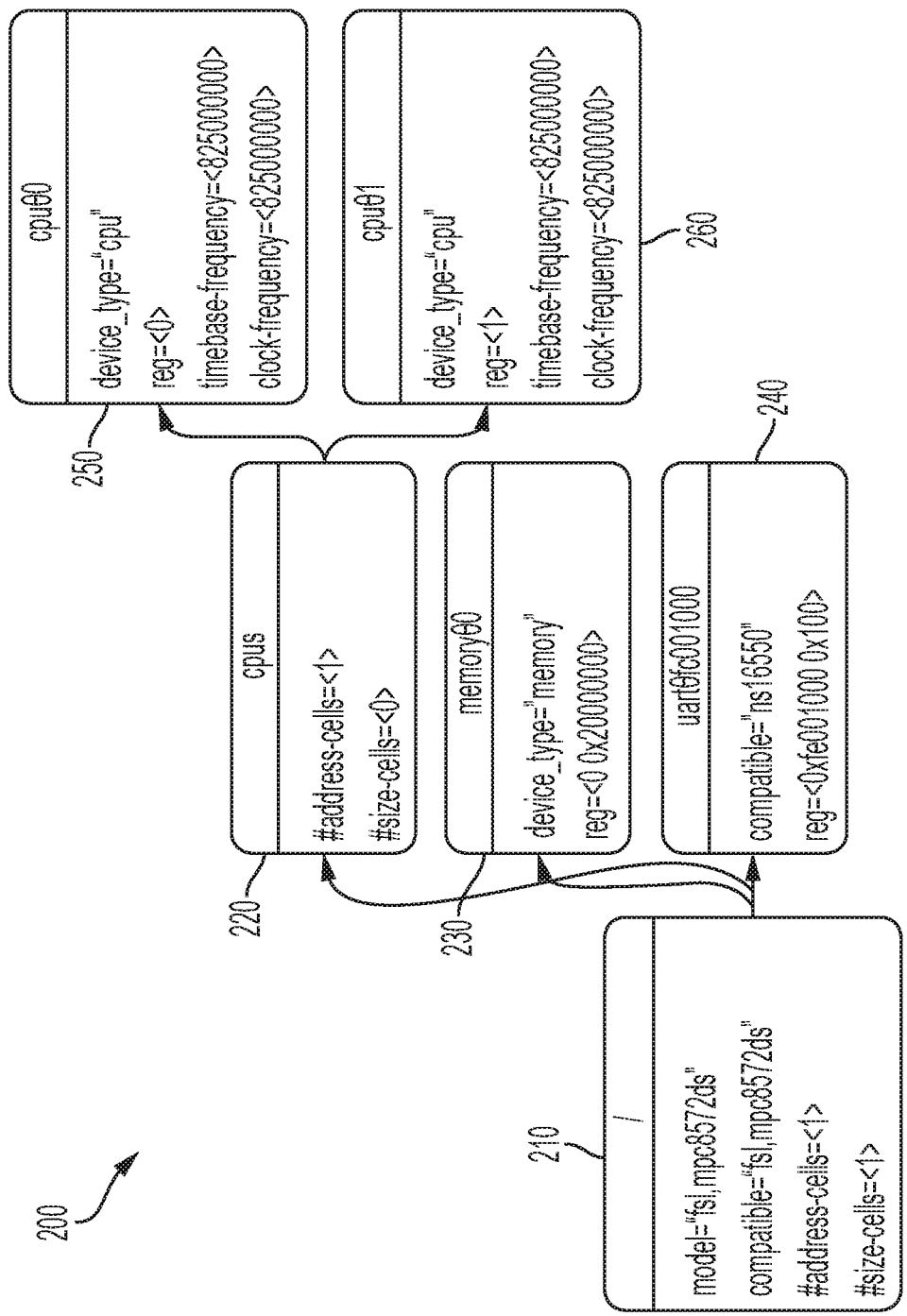
FIG. 2 is a diagram showing an example device tree for a particular device.

FIG. 2 is a diagram showing an example device tree 200 for a particular device. The device set out in device tree 200 includes a root node 210, three (3) first descendent nodes 220, 230, 240, and two (2) second descendent nodes 250, 260. Root node 210 includes a model ID (fs1, mpc8572ds), a compatible property (fs1, mpc8572ds), the number of address cells (1), and the cell size (1). The first descendent nodes include "cpus" 220, "memory @0" 230, and "uart@fe001000" 240. The second descendent nodes include "cpu@0" 250, and "cpu@1" 260. So, based on the information contained in device tree 200, this device includes two cpus, a memory, and a Universal Asynchronous Receiver/Transmitter (UART).

Each node in a device tree can be uniquely identified by specifying the full path from the root node, through all descendent nodes, to the desired node. For example, the convention for specifying a device path is /node-name-1/node-name-2/node-name-N, whereby in FIG. 2 the device path to cpu #1 would be /cpus/cpu@1, the path to cpu #2 would be cpus/cpu@2, and whereby the path to the root node would be /.

In one or more embodiments, device information such as device tree information shown in FIG. 2 (which shows components making up a device, and their relationships to each other, as a tree structure), may be converted into system boot tables, such as ACPI tables that store ACPI information, for use by an OS/hypervisor at multiple layers (e.g., at boot stage, and after boot stage for CPU, memory or cache access, and for device driver access/control). One feature of ACPI that allows for relatively straightforward conversion of device information into ACPI information is the '_DSD device properties' feature, which is a feature recommended by enterprise-grade ARM® OS/hypervisors to support SBBR-compliant systems.

FIG. 3 shows exemplary code 300 for converting device tree-like data into ACPI data using the '_DSD device properties' feature. The exemplary code 300 shown in FIG. 3 corresponds to AML byte-code for detailing a hierarchy of system devices (and the components making up those system devices) for inclusion in the ACPI Differentiated System Description (DSDT) "devices" table, which corresponds to a non-statically defined boot table.

Figure 4:
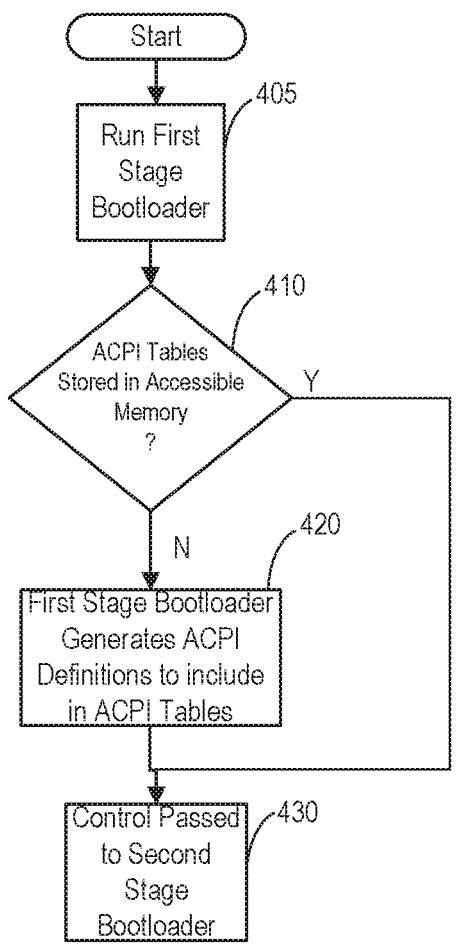
FIG. 4 is a flow chart of a method of obtaining ACPI data from device tree data for use by an OS/hypervisor, according to one or more embodiments.

FIG. 4 is a flow chart of a method 400 for obtaining ACPI data for use by an OS/hypervisor according to one or more embodiments. System firmware starts up, in step 405, upon system startup and after Power On Self-Test (POST) has been completed by system firmware, a first-stage bootloader. The method then flows to step 410. First-stage bootloader determines, in step 410, whether there are ACPI tables stored in the memory accessible by the first-stage bootloader. This step is performed since first-stage bootloader needs to pass information as to their location in the memory to the OS/hypervisor that is booted up by a second-stage bootloader after first-stage bootloader has completed its boot tasks. If there are ACPI tables stored in the memory, ("Y" path output from step 410), then the method flows to step 430, in which control is passed to second-stage bootloader.

On the other hand, if the first-stage bootloader does not find any ACPI tables stored in the memory ("N" path output from step 410), then the method flows to step 420. First-stage bootloader generates, in step 420, ACPI definitions to include in ACPI tables to be created by the first-stage bootloader on the fly. The non-presence of ACPI tables in memory may be due, for example, to the system firmware that runs on system boot not passing ACPI tables in a standards-compliant UEFI manner using an UEFI configuration table.

After having completed the creation of ACPI tables (or determining that ACPI tables exist in memory), first-stage bootloader performs all other tasks associated with first stage bootloading, and then the method flows to step 430. First-stage bootloader hands off control in step 430 to second-stage bootloader. When second-stage bootloader obtains control of the boot process, second-stage bootloader sets up computer system 100 to run a kernel (vmkBoot) stored in a predetermined location of memory, to thereby open up OS/Hypervisor.

ACPI tables are of two types, one type being statically-defined system boot tables that follow straight structure definitions (e.g., RSDP, FADT, MADT, GTDT, CSRT, DBG2), and the other type being non-statically defined system boot tables, such as the DSDT "devices" table that includes AML byte-code. As discussed earlier, ACPI DSDT "devices" table describes a hierarchy of system devices including information as to which peripherals the machine has, and as such is similar in some respect to a device tree hierarchy.

Figure 5:
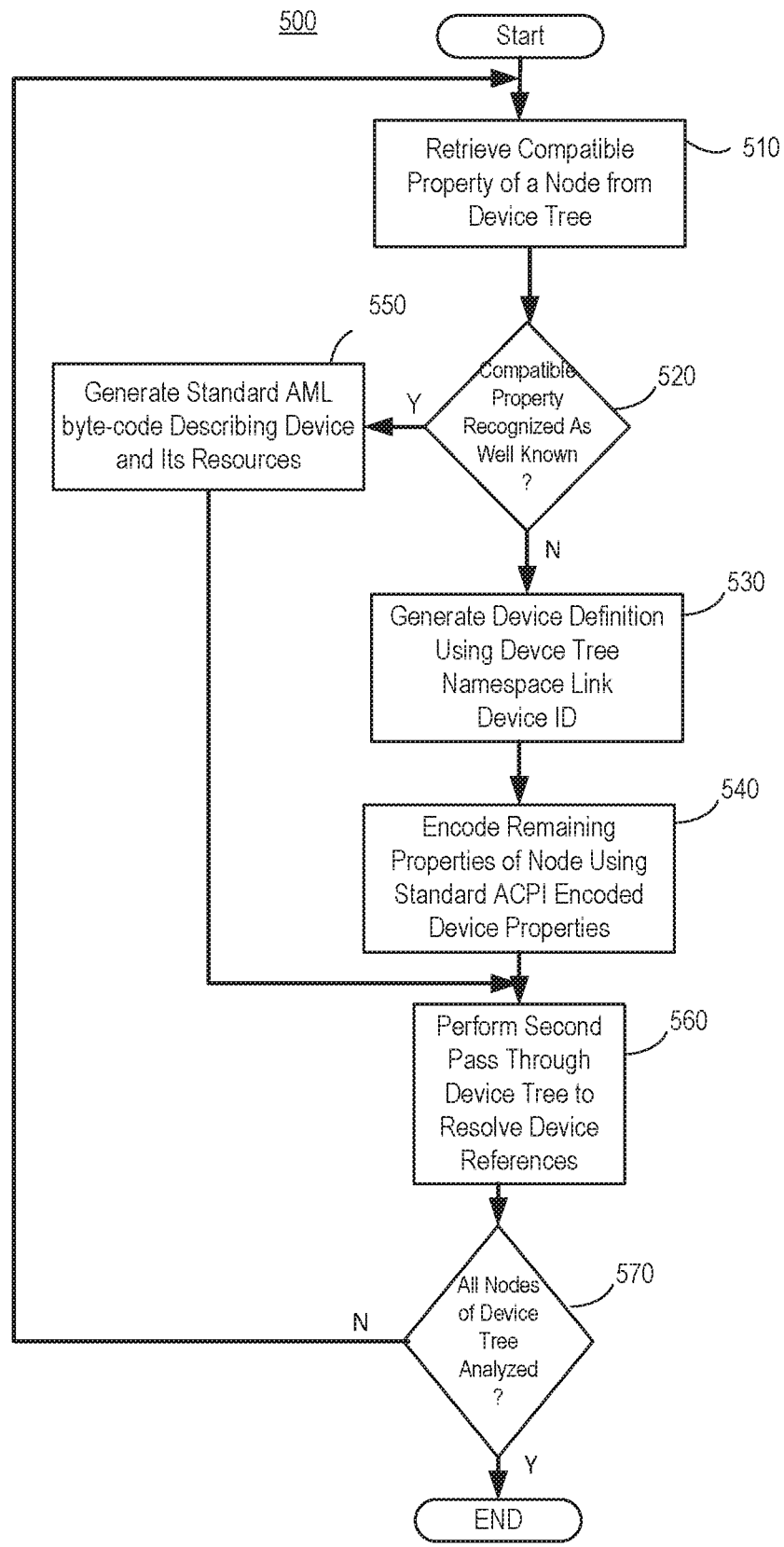
FIG. 5 is a flow chart of a method of creating byte-code from device tree data to be stored in a "devices" DSDT table, according to one or more embodiments.

As first-stage bootloader processes the device information, which comprises hierarchical information of components making up a device, such as cpus, memories, universal asynchronous receivers/transmitters (UARTs), peripherals, etc., and the relationships of those components with respect to each other within the device, such as the information in device tree 200 as shown in FIG. 2, first-stage bootloader generates the ACPI specification-mandated serial port, console, debug port, timer, and interrupt controller, Fixed ACPI, PCIe segment, System Memory Management Unit (SMMU), and Non-Uniform Memory Access (NUMA) statically-defined system boot tables directly from information included in the device tree, as these ACPI tables have a direct analogue to definitions in the device tree. However, for each device tree definition that does not have a statically-defined system boot table analogue, first-stage bootloader may perform the method 500 shown in FIG. 5 to create byte-code to be stored in the "devices" DSDT table.

First-stage bootloader retrieves, in step 510, for each device node in the device tree, the "compatible" property of that node (i.e., the device identification). The method then flows to step 520.

First-stage bootloader determines, in step 520, whether or not it recognizes the "compatible" property as a well-known property for which first-stage bootloader knows how to parse the rest of the properties and convert them into a well-known ACPI device having an industry-recognized Hardware ID (_HID) or Compatible ID (_CID) identifier, each of which corresponds to an identifier associated with a computer system boot standard such as ACPI. If first-stage bootloader does not recognize the "compatible" property, then the method flows to step 530. First-stage bootloader generates, in step 530, a device definition using the device tree (DT) namespace link device ID obtained from the device tree for that node as the Hardware ID (HID) required for ACPI. After completion of step 530, the method flows to step 540. First-stage bootloader encodes, in step 540, all remaining properties (including "compatible") of the device node are encoded using the standard ACPI way of encoded device properties.

In more detail, device tree uses device identification based on the "compatible" property having a value corresponding to a string or an array of strings recognized as device identifiers by device drivers and a driver core. The set of all those strings may be regarded as a device identification namespace analogous to the ACPI ID namespace. Consequently, a new (and arguably redundant) ACPI device ID is not allocated for a device with an existing identification string in the device tree namespace, especially if that ID is only needed to indicate that a given device is compatible with another one. In ACPI, the device identification objects called HID (Hardware ID) and _CID (Compatible ID) are used to list the IDs of devices the given device is compatible with, whereby those IDs must belong to one of the namespaces mandated by the ACPI specification, in which the device tree namespace is not one of them. Further, the ACPI specification mandates that either a Hardware ID (_HID) object or an Address (_ADR) identification object be present for all ACPI objects representing devices. For non-enumerable bus types, that object corresponds to _HID and its value is set to a device ID from one of the namespaces prescribed by the ACPI specification.

A special device tree namespace link device ID, PRP0001, provides a way to use the existing device tree-compatible device identification in ACPI and to satisfy the above requirements following from the ACPI specification at the same time. Namely, if PRP0001 is returned by the Hardware ID (HID), first-stage bootloader looks for the "compatible" property in the device object's Device Specific Data (_DSD) and uses the value of that property to identify the corresponding device in a manner analogous to a device tree device identification algorithm.

If first-stage bootloader recognizes the "compatible" property as a well known property for which first-stage bootloader knows how to parse the rest of the properties and convert them into a well-known ACPI device having an industry-recognized HID/CID identifier ("Y" output from step 520), then the method flows to step 550. First-stage bootloader generates, in step 550, the standard AML byte-code describing the device and its resources, for inclusion in the "devices" DSDT table, which is a non-statically-defined system boot table. Examples of such well-known devices include enhanced controller interface (ECHI) controllers, eXtensible Host Controller Interface (XEHCI) controllers, PCI Enhanced Configuration Access mechanism (ECAM)-compatible root bridges, serial controllers, Serial Advanced Technology Attachment (SATA) controllers, and Secure Digital High Capacity (SDHC) controllers. After completion of step 550, the method flows to step 560.

First-stage bootloader performs, in step 560, a second pass in order to resolve device references (e.g., a device in one node of a device tree converted into ACPI information references another device that has not had its device information converted into ACPI information). After completion of step 560, the method flows to step 570.

First-stage bootloader checks, in step 570, whether all of the nodes of the device tree have been converted. If all of the nodes of the device tree have been converted ("Y" path output from step 570), the process ends, and the OS/hypervisor may then utilize the ACPI information for a SoC on an edge of an enterprise network in the same manner that it could for a multi-core processor that is not located on the edge of the enterprise network. If not all of the nodes of the device tree have been converted ("N" output path from step 570), then the method returns to step 510 to process another node of the device tree that has not had its information converted to ACPI information.

The device tree-to-ACPI conversion according to one or more embodiments described herein may lead in some instances to some imperfect information, but having some imperfect information is typically better than having no information available for access by an OS/hypervisor on an edge device. Also, the device tree-to-ACPI conversion process may yield a somewhat malformed result for some device elements, relative to the general expectations of SBBR-compatible systems. For example, a system with a customer interrupt controller may boot without an MADT (ACPI interrupt controller) table, or even with a customer (non-standard) table definition. In such an instance, the OS/hypervisor may need to deal with such situations, on a case-by-case manner, whereby the device tree-to-ACPI conversion process does not remove the need to add platform support to the OS/hypervisor for such custom drivers, as would be the case for any device on the enterprise network, whether it is on the edge of the network or not.

Also, drivers for a device that have been provided the ID 'PRP0001' in an ACPI table in the device tree-to-ACPI conversion process described above may need to be analyzed within the actual _DSD property of the device in order to verify whether the drivers are associated (and thus compatible) with the device.

Figure 6:
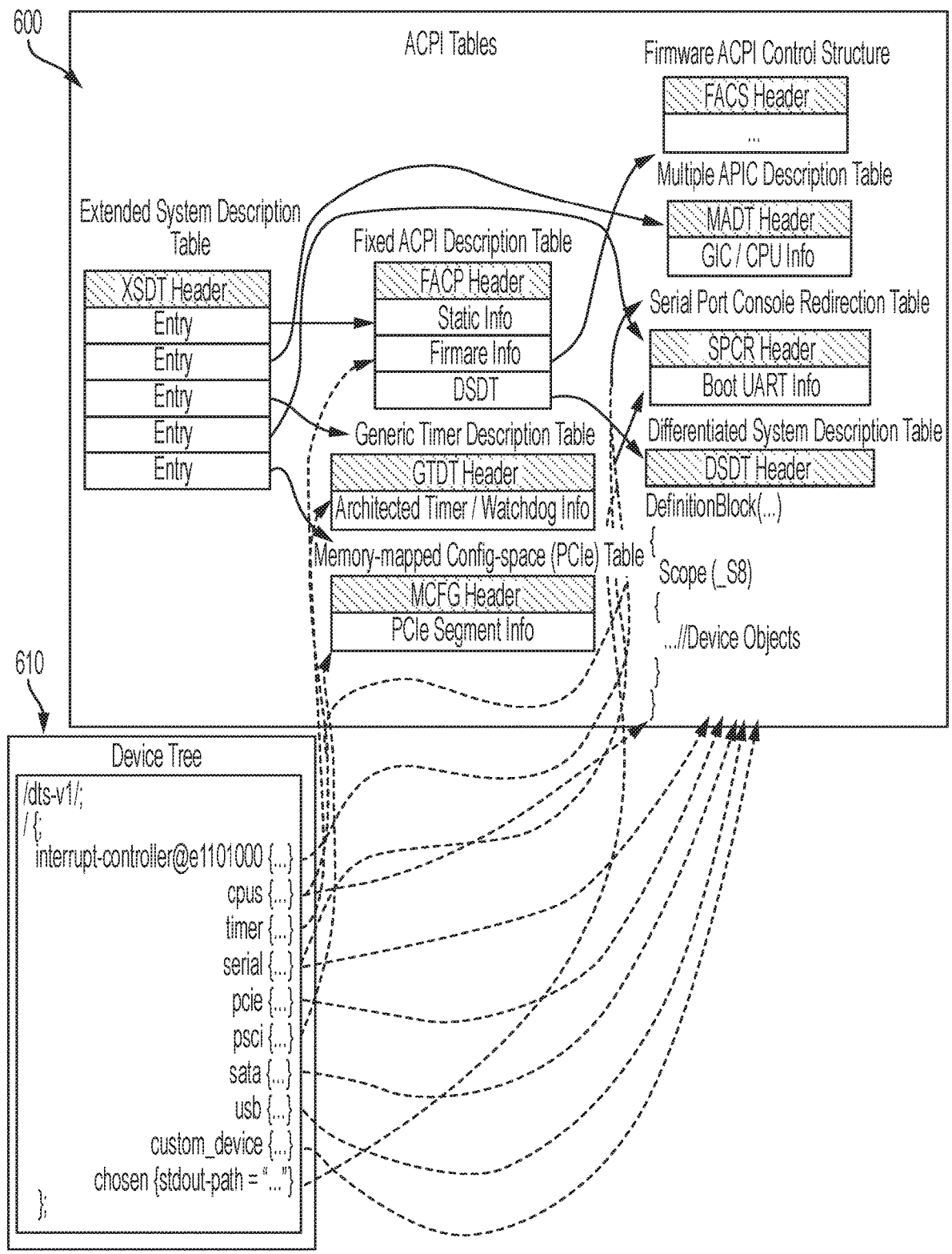
FIG. 6 is a diagram showing a plurality of ACPI tables within which the device tree information of a device tree has been populated with, according to one or more embodiments.

FIG. 6 is an exemplary diagram showing a plurality of ACPI tables 600 including statically-defined ACPI tables and a non-statically-defined DSDT "devices" table (in which AML byte-code created based on the device information is stored in the DSDT "devices" table), within which the device information of device tree 610 has been populated with. In particular, the information obtained from device tree 610 is used to populate the following ACPI tables: Fixed ACPI Description Table, Generic Timer Description Table, Memory-mapped Confi-space (PCIe) Table, Firmware ACPI Control Structure Table, Multiple APIC Description Table, Serial Port Console Redirection Table, and Differentiated System Description Table (DSDT).

Figure 7A:
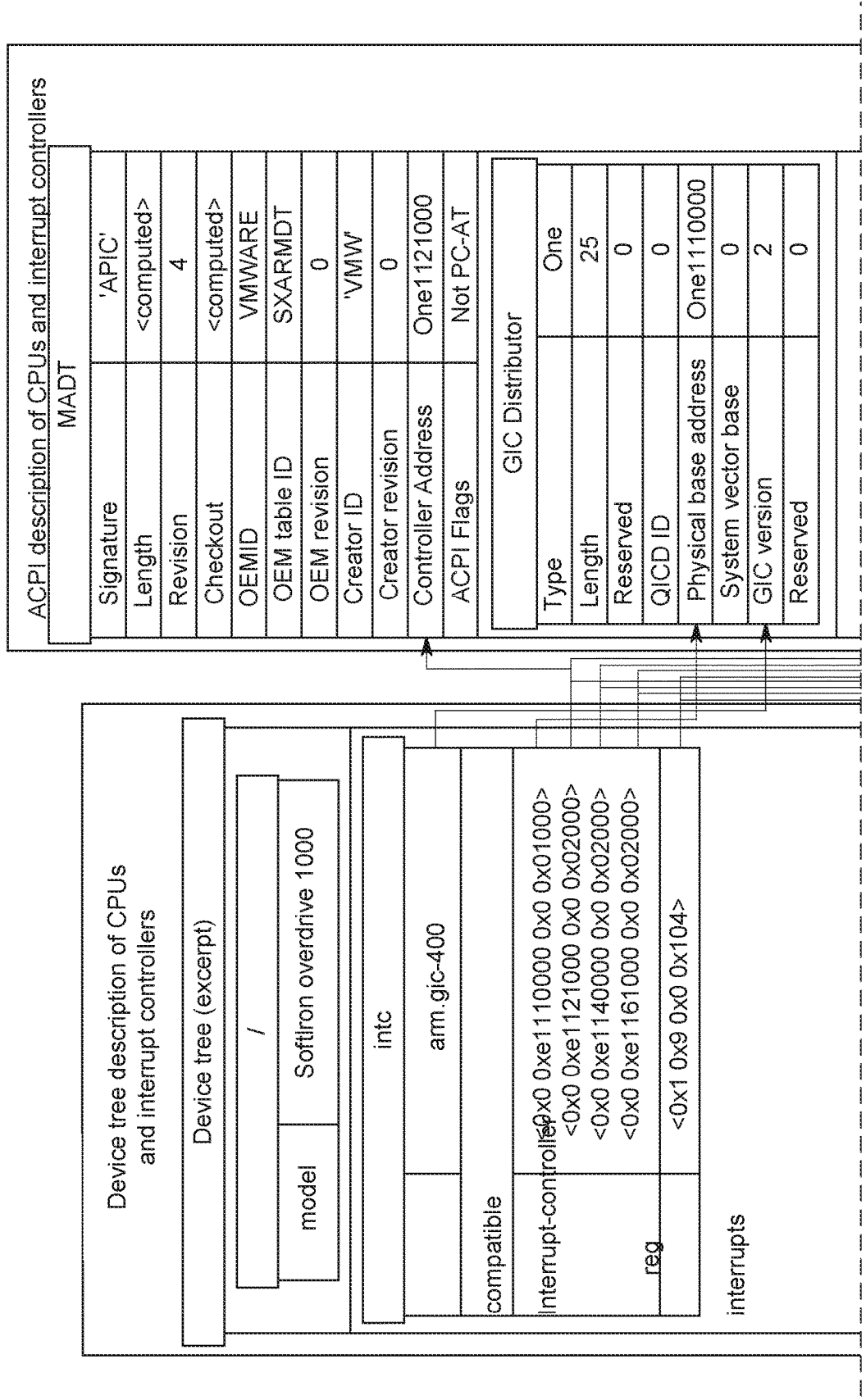
Figure 7B:
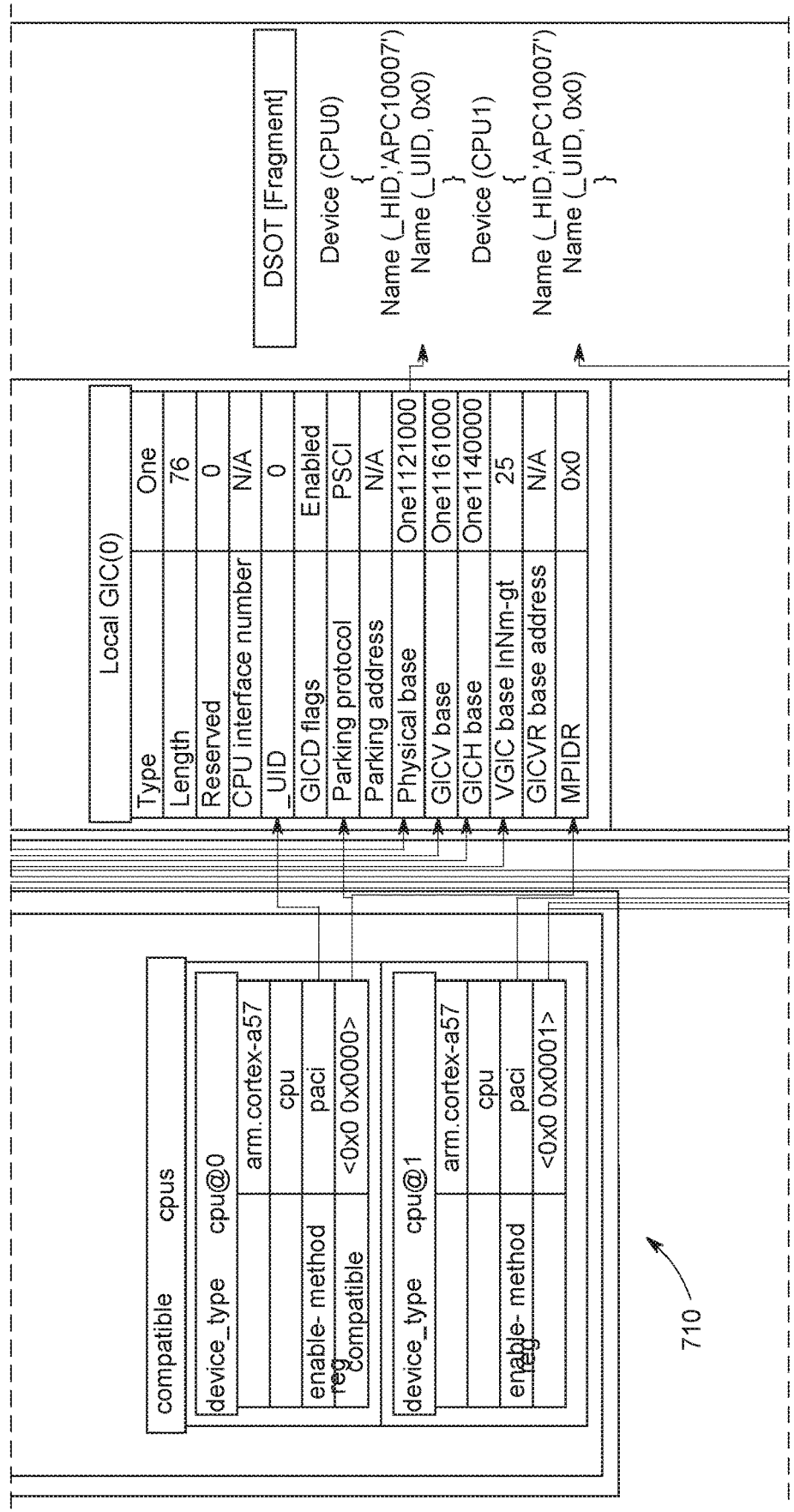

FIGS. 7A, 7B and 7C, collectively FIG. 7, is a diagram showing an exemplary conversion of device information 710 comprising a description of CPUs and interrupt controllers 710, to ACPI information 720 corresponding to CPUs and interrupt controllers. Device information 710 may be obtained, for example, from device tree 200 shown in FIG. 2, and may be used to populate the following ACPI tables: Multiple APIC Description Table (MADT), GIC Distributor Table, Local GIC(0) Table, Local GIC(1) Table, and DSDT "devices" Table (comprising AML byte-code).

Figure 8A:
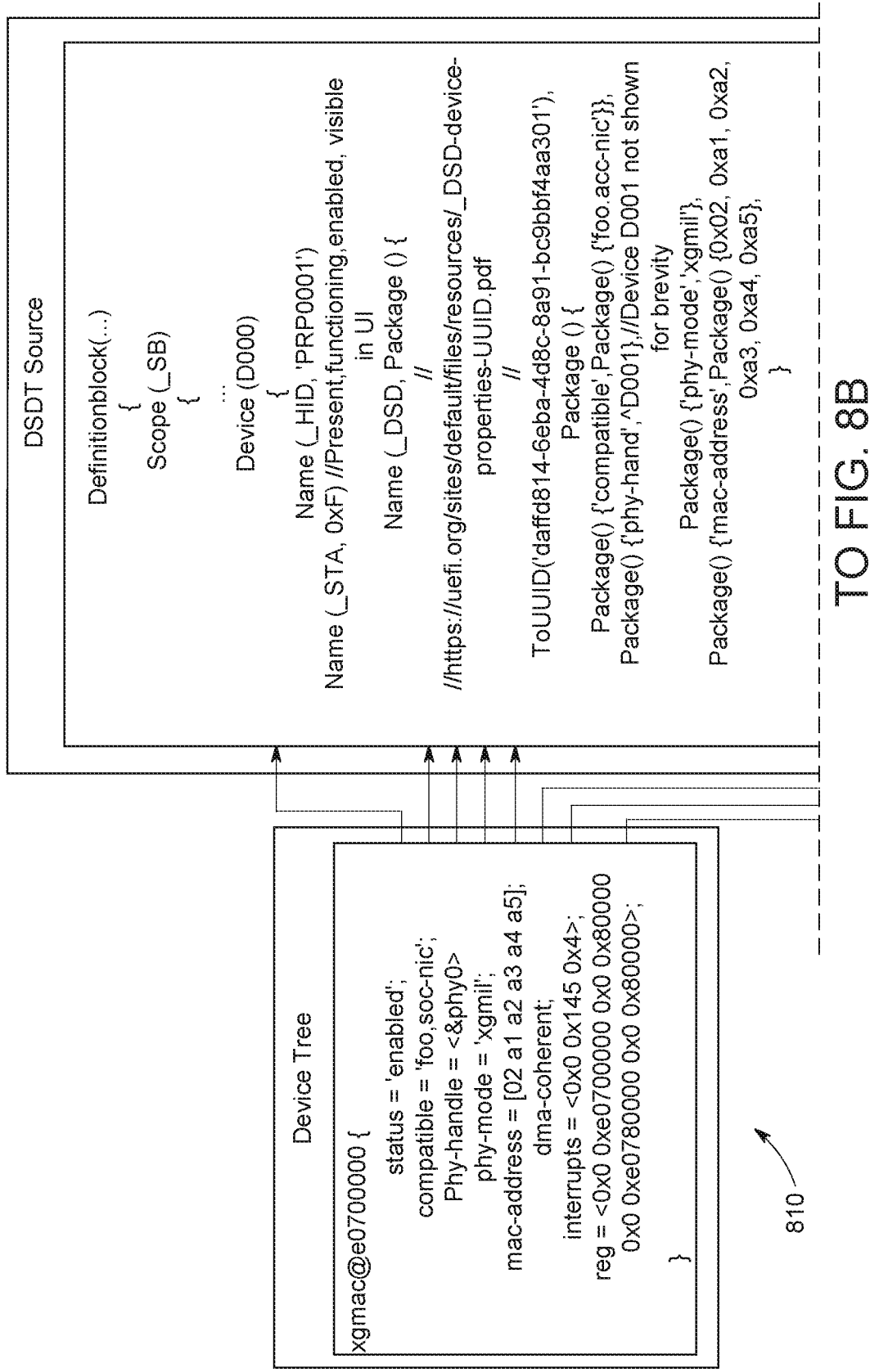
FIGS. 8A and 8B, collectively
Figure 8B:
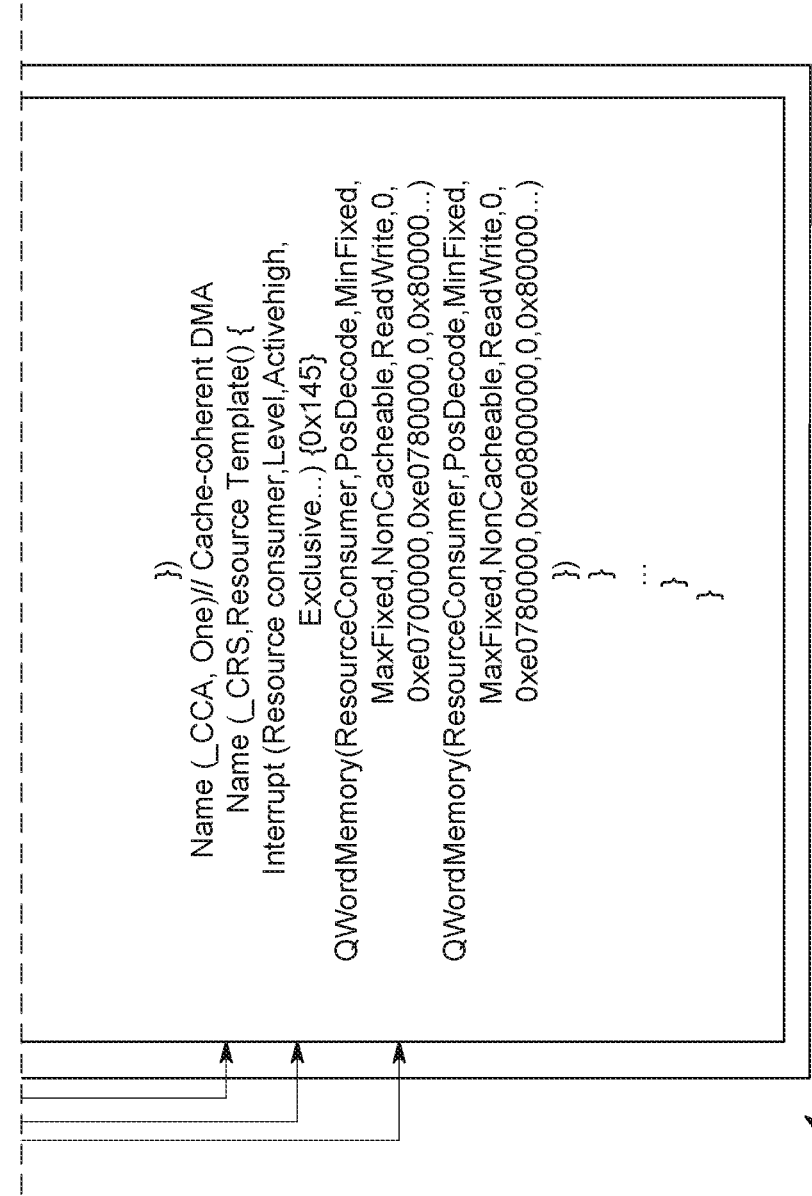

FIGS. 8A and 8B, collectively FIG. 8, is a diagram showing an exemplary conversion of device tree node 810 into AML byte-code to be stored in ACPI DSDT "devices" Table 820, according to one or more embodiments. Device tree node 810 may correspond, for example, to one of the device tree nodes 210, 220, 230, 240, 250, 260 of device tree 200 shown in FIG. 2.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), a CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, a virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s). Additionally, while embodiments have been described above with respect to conversion of device information into information compatible for inclusion in ACPI tables that store information on component computer components in accordance with the ACPI standard, conversion of device information into other types of system boot tables (or boot firmware tables) that store information on computer components in accordance with other system boot standards may be envisioned while remaining within the spirit and scope of the invention.

What is claimed is:

1. A method for generating boot tables for a first device, the first device having access to device information that describes a relationship of one or more components of the first device, the method comprising:
   determining, by a bootloader of system software installed on the first device, whether there exists at least one system boot table stored in a memory of the first device by firmware of the first device;
   if it is determined by the bootloader that there does not exist at least one system boot table stored in the memory of the first device by the firmware, retrieving the device information from the first device by the bootloader; and
   converting, by the bootloader, the device information to at least one system boot table, the converting comprising:
      generating a first system boot table by populating the first system boot table with information associated with one of more components of the first device that have a one-to-one correspondence to a computer system boot information standard; and
      generating a second system boot table for at least one other component of the first device that does not have a one-to-one correspondence to the computer system boot information standard, by creating an entry in the second system boot table that is populated with an identifier that is used to find a compatible component defined in the computer system boot standard.

2. The method according to claim 1, wherein the first system boot table and the second system boot table are utilized by the system software executing on the first device to enable communications between the first device and a second device after booting of the first device has completed.

3. The method according to claim 1, wherein the entry created in the second system boot table is further populated with byte code that contains a property of said at least one other component of the first device.

4. The method according to claim 3, wherein, during booting, the compatible component is determined based on the identifier and the property of said at least one other component of the first device.

5. The method according to claim 1, wherein the second system boot table is generated to have another entry for another component of the first device that does not have a one-to-one correspondence to the computer system boot information standard, and wherein said another entry is populated with said identifier.

6. The method according to claim 1, wherein the computer system boot information standard comprises Advanced Configuration and Power Interface (ACPI).

7. The method according to claim 1, wherein the first device comprises a system-on-chip (SoC) device.

8. A non-transitory computer readable medium comprising instructions for causing a processor of a machine to perform a method of generating boot tables for a first device, the first device having access to device information that describes a relationship of one or more components of the first device, wherein the method comprises:
- determining, by a bootloader of system software installed on the first device, whether there exists at least one system boot table stored in a memory of the first device by firmware of the first device;
- if it is determined by the bootloader that there does not exist at least one system boot table stored in the memory of the first device by the firmware, retrieving the device information from the first device by the bootloader; and
- converting the device information to at least one system boot table, the converting comprising:
  - generating a first system boot table by populating the first system boot table with information associated with one of more components of the first device that have a one-to-one correspondence to a computer system boot information standard; and
  - generating a second system boot table for at least one other component of the first device that does not have a one-to-one correspondence to the computer system boot information standard, by creating an entry in the second system boot table that is populated with an identifier that is used to find a compatible component defined in the computer system boot standard.

9. The non-transitory computer readable medium according to claim 8, wherein the first system boot table and the second system boot table are utilized by the system software executing on the first device to enable communications between the first device and a second device after booting of the first device has completed.

10. The non-transitory computer readable medium according to claim 8, wherein the entry created in the second system boot table is further populated with byte code that contains a property of said at least one other component of the first device.

11. The non-transitory computer readable medium according to claim 10, wherein, during booting, the compatible component is determined based on the identifier and the property of said at least one other component of the first device.

12. The non-transitory computer readable medium according to claim 8, wherein the second system boot table is generated to have another entry for another component of the first device that does not have a one-to-one correspondence to the computer system boot information standard, and wherein said another entry is populated with said identifier.

13. The non-transitory computer readable medium according to claim 8, wherein the computer system boot information standard comprises Advanced Configuration and Power Interface (ACPI).

14. The non-transitory computer readable medium according to claim 9, wherein the first device comprises a system-on-chip (SoC) device.

15. A computer system, comprising:
- a system memory which includes memory regions for storing a program and device information of a first device; and
- the program configured to carry out the steps of:
  - determining, by a bootloader of system software installed on the first device, whether there exists at least one system boot table stored in the system memory by firmware of the first device;
  - if it is determined by the bootloader that there does not exist at least one system boot table stored in the system memory by the firmware, retrieving the device information from the first device by the bootloader; and
  - converting the device information to at least one system boot table, the converting comprising:
    - generating a first system boot table by populating the first system boot table with information associated with one of more components of the first device that have a one-to-one correspondence to a computer system boot information standard; and
    - generating a second system boot table for at least one other component of the first device that does not have a one-to-one correspondence to the computer system boot information standard, by creating an entry in the second system boot table that is populated with an identifier that is used to find a compatible component defined in the computer system boot standard.

16. The computer system according to claim 15, wherein the first system boot table and the second system boot table are utilized by the system software executing on the first device to enable communications between the first device and a second device after booting of the first device has completed.

17. The computer system according to claim 15, wherein the entry created in the second system boot table is further populated with byte code that contains a property of said at least one other component of the first device.

18. The computer system according to claim 17, wherein, during booting, the compatible component is determined based on the identifier and the property of said at least one other component of the first device.

19. The computer system according to claim 15, wherein the second system boot table is generated to have another entry for another component of the first device that does not have a one-to-one correspondence to the computer system boot information standard, and wherein said another entry is populated with said identifier.

20. The computer system according to claim 15, wherein the computer system boot information standard comprises Advanced Configuration and Power Interface (ACPI).

* * * * *